US006946185B2

(12) United States Patent
Kauffman et al.

(10) Patent No.: US 6,946,185 B2
(45) Date of Patent: Sep. 20, 2005

(54) USE OF COLLAPSIBLE MICROSPHERES TO CREATE TEXTURE IN SURFACE COVERINGS

(75) Inventors: William J. Kauffman, Manheim, PA (US); Malcolm John Selby, Great Ayton (GB); Rajmeet Kaur Jagdev, Stockton-On-Tees (GB)

(73) Assignee: AWI Licensing Company, Wilmington, DE (US)

( * ) Notice: Subject to any disclaimer, the term of this patent is extended or adjusted under 35 U.S.C. 154(b) by 181 days.

(21) Appl. No.: 10/303,603

(22) Filed: Nov. 25, 2002

(65) Prior Publication Data

US 2004/0101675 A1 May 27, 2004

(51) Int. Cl.[7] ........................... B32B 3/00; B32B 15/02

(52) U.S. Cl. ........................ 428/172; 428/141; 428/142; 428/204; 428/207; 428/314.2; 428/315.9; 428/402; 428/402.2; 428/908.8

(58) Field of Search ................................ 428/156, 172, 428/204, 206, 207, 398, 402, 141, 142, 304.4, 314.2, 315.9, 402.2, 908.8

(56) References Cited

U.S. PATENT DOCUMENTS

| | | | | |
|---|---|---|---|---|
| 3,515,569 A | | 6/1970 | Walters et al. | 117/21 |
| 4,614,680 A | * | 9/1986 | Fry et al. | 428/158 |
| 5,506,030 A | * | 4/1996 | Landers et al. | 428/143 |
| 6,841,221 B2 | | 1/2005 | MacQueen | 428/141 |
| 2001/0028945 A1 | | 10/2001 | Chen et al. | 428/292.1 |

FOREIGN PATENT DOCUMENTS

| | | | |
|---|---|---|---|
| GB | 1044680 | 10/1966 | C08F/47/08 |

OTHER PUBLICATIONS

European Search Report Communication—Application No. EP 03 02 4359 dated Oct. 8, 2004.

* cited by examiner

*Primary Examiner*—Donald J. Loney

(57) ABSTRACT

Surface coverings and surface covering components that include a textured transparent or translucent wear layer and a design layer, where the design layer is printed with an ink that includes collapsible microspheres, are disclosed. Also disclosed are methods of manufacturing such surface coverings and surface covering components. In one embodiment, a pattern is printed on a substrate to be coated with a wear layer. In another embodiment, a clear transparent or translucent layer underlies the design layer. The ink includes collapsible microspheres, and can also include foaming inhibitors. A number of surface covering substrates and surface coverings can be prepared using the methods described herein. The surface coverings include a substrate, for example, a foamable substrate, a design layer printed with an ink composition that includes collapsible microspheres, and a wear layer. The ink compositions containing the collapsible microspheres can be printed via conventional gravure methods, and the transparent or translucent wear layer can also be printed using conventional methods. The fusion process through which the wear layer is applied and fused causes the microspheres to expand, and then results in the just expanded microspheres collapsing under the weight of the wear layer.

24 Claims, 2 Drawing Sheets

USE OF COLLAPSIBLE MICROSPHERES TO CREATE TEXTURE IN SURFACE COVERINGS

FIELD OF THE INVENTION

The present invention relates generally to the field of surface coverings. More particularly, the present invention relates to surface coverings including a design layer and a transparent or translucent wear layer, with a texture provided using collapsible microspheres in the design layer, as well as methods of making such surface coverings.

BACKGROUND OF THE INVENTION

Many surface coverings include patterns applied using rotogravure printing, where colors and patterns are printed on the surface of a base layer. Rotogravure printing uses a rotating cylinder to print colored inks on top of the core layer, and is capable of providing an extremely large number of possibilities in patterns and designs. Typically, the printed pattern is covered with a clear vinyl wear layer and the product is oven cured.

Many of these decorative surface coverings, particularly in the flooring industry, include a textured surface. For example, a textured surface can be used to provide a more natural appearance for decorative patterns, such as wood, slate, mosaic, brick, and other natural products, which have been printed onto a substrate. The presence of the surface texture can provide a more realistic visual or natural appearance of a natural product. The texture is typically imparted by means of various mechanical and chemical embossing techniques. The chemical embossing techniques often involve printing an ink that includes a foaming inhibitor, to inhibit foaming in the printed regions.

Expandable microspheres such as the commercially available Micopearl® and Expancell® have been incorporated into ink formulations, printed in design layers, and then expanded to provide a raised surface texture. Examples of such textured materials include wallpaper with a "suede-like" texture.

It would be advantageous to provide further methods for providing texture to surface coverings. The present invention provides such methods, and surface coverings prepared according to these methods.

SUMMARY OF THE INVENTION

Surface coverings and surface covering components that include a textured transparent or translucent wear layer and a design layer, where the design layer is printed with an ink that includes collapsible microspheres, are disclosed. The ink includes collapsible microspheres, and can also include foaming inhibitors. Also disclosed are methods of manufacturing such surface coverings and surface covering components.

In one embodiment, a pattern is printed on a substrate to be coated with a wear layer. In another embodiment, a clear transparent or translucent layer underlies the design layer.

A number of surface covering substrates and surface coverings can be prepared using the methods described herein. The surface coverings include a substrate, for example, a foamable substrate, a design layer printed with an ink composition that includes collapsible microspheres, and a wear layer. The substrate and/or the wear layer can be chemically and/or mechanically embossed. The surface coverings or surface covering components can further include a top coat layer overlying the wear layer. In one embodiment, a surface covering substrate including the wear and design layer is laminated onto a surface to provide a surface covering.

The ink compositions containing the collapsible microspheres can be printed via conventional gravure methods, and the transparent or translucent wear layer can also be applied using conventional methods, for example, as a fusible plastisol. The process by which the wear layer is applied and fused causes the microspheres to expand, and then results in the just expanded microspheres collapsing under the weight of the wear layer. This results in a fine texturing of the wear layer that allows various new designs varying from new 'skin' textures' to textured grout lines.

DETAILED DESCRIPTION OF THE INVENTION

Figure 1:
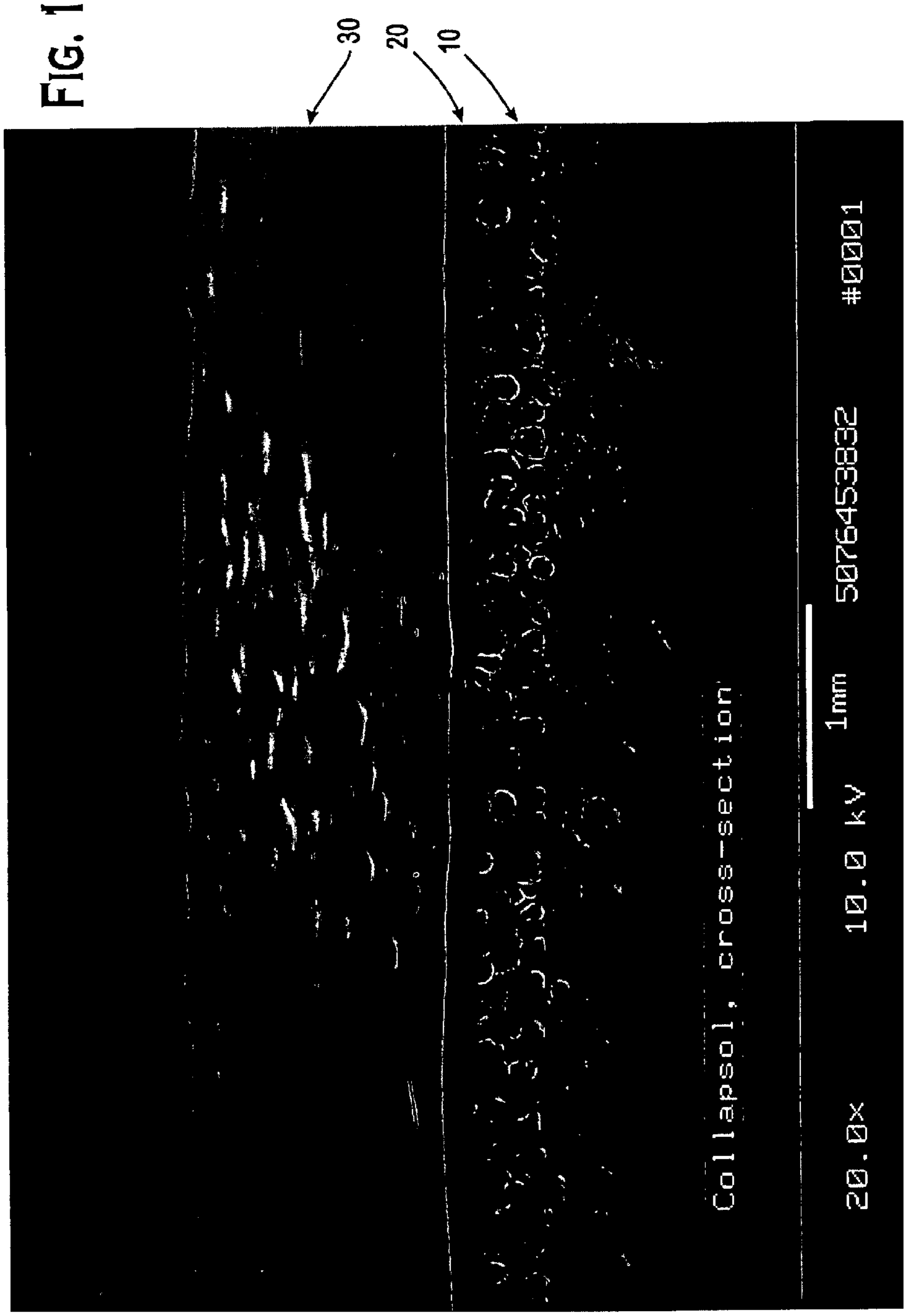
FIG. 1 is a schematic illustration of an embodiment of the methods described herein for providing a surface covering including textured portions produced by collapsed microspheres, where the surface covering has not been chemically embossed.

Surface coverings and surface covering components that include a textured transparent or translucent wear layer and a design layer, where the design layer is printed with an ink that includes collapsible microspheres, are disclosed. Also disclosed are methods of manufacturing such surface coverings and surface covering components.

For a more complete understanding of the present invention, reference should be made to the following detailed description taken in connection with the accompanying drawings.

I. Surface Coverings

Virtually any surface covering substrate can be textured using the compositions and methods described herein. Examples of surface covering substrates that can be prepared using the compositions and methods described herein include those described, for example, in U.S. Pat. Nos. 4,781,987, U.S. Pat. No. 4,855,165 and U.S. Pat. No. 5,643,677, the contents of which are hereby incorporated by reference.

Surface coverings that include a substrate layer, design layer, clear transparent or translucent wear layer and, optionally, a top coat layer can be, for example, floor coverings, wall and ceiling coverings, countertops, laminates, and other surfaces that can be covered with decorative surface coverings. Examples include wallpaper, vinyl flooring products and the like.

Resilient Support Surface

The surface covering substrate layer can be or include a resilient support surface. Such surfaces are well known in the art, and include, for example, vinyl polymers such as polyvinyl chloride. The layers can be formed, for example, from backing materials, saturated glass mats, plastisols, foamed plastisols, randomly dispersed vinyl particles, stencil disposed vinyl particles, and the like. In one embodiment, a foamable substrate is employed. The selection of these materials is within the skill of an ordinary artisan. The thickness of such support surfaces is typically, but not necessarily, in the range of 10 to 100 mils. A felt base layer can also be used. The thickness of such a felt layer is typically, but not necessarily, in the range of 15 to 30 mils.

The resilient support layer can include or be adjacent to a hot-melt calendared layer, for example, of a polyvinyl chloride, polyolefin or other thermoplastic polymer. The thickness of this layer can be from 15 to 60 mils, although thicknesses outside this range can be used.

Chemically Embossed Layer

In one embodiment, the surface covering includes a chemically embossed layer, foamed after the printed pattern layer containing the microspheres is applied. This type of layer is typically applied as a foamable plastisol and then heat gelled to allow for printing. The thickness of the gel layer is typically, but not necessarily, in the range of 6 to 20 mils in an un-blown state, and between 12 and 60 mils when blown ("cured"). Foaming agents, promoters or inhibitors can be present in the gel layer and/or present in a printed pattern in an adjacent layer to the gel layer. Such agents provide chemical embossing in register with the agents, where the foamed portion corresponds to the presence of the foaming agent and/or promoter, and the un-foamed portion corresponds to the absence of the foaming agent and/or the presence of a foaming inhibitor. Typically, the foaming is done by subjecting the foamable layer to elevated temperatures, for example, in the range of 120 to 250° C., in one embodiment, between 180 and 250° C., for between 0.5 and 10 minutes.

Printed Pattern Layer

The pattern layer can be a decorative, multicolored pattern or design, for example, representing wood, stone, brick or other decorative patterns. Certain predetermined areas can contain a blowing or foaming inhibitor which subsequently modifies or alters the action of a blowing or foaming agent in or adjacent to those certain predetermined areas. Several different printing ink compositions can be used in such procedures. The pattern layer is not necessarily a continuous layer. In one embodiment, the pattern only covers a portion of the underlying layer. In locations where there is no pattern, the overlying wear layer will therefore be adhered to the layer underlying the pattern layer, which in turn can be a substrate layer, a foam layer or other suitable layer.

Printed pattern layers are typically less than one mil in thickness when applied using a rotogravure process, or one mil or greater when applied using a screen process. When the print layer includes foaming inhibitors in addition to the microspheres, it is able to provide chemical embossing to the gel layer and surface texture to the overlying wear layer.

Printing Inks

Any ink formulation capable of being printed via rotogravure printing or other printing techniques conventionally used in printing pattern layers on surface coverings can be used. Typically, the ink formulations include an ink or pigment, in solution, suspension and/or dispersion in an appropriate solvent system. In some embodiments, the inks are plastisols that are cured by application of heat after they are applied. In other embodiments, the inks are solvent or water-based inks. Such ink formulations are well known to those of skill in the art.

Collapsible Microspheres

Expandible microspheres are known in the art. An "expandable polymeric microsphere" is a microsphere that includes a polymer shell and a core material of a gas, a relatively volatile hydrocarbon (a "blowing agent"), or combinations thereof, that expands upon heating. As used herein, collapsible microspheres are those that expand upon heating and that collapse from additional heating and/or under the weight of the overlying wear layer. Any microsphere that is capable of expanding when heated, and collapsing under the weight of the wear layer as the plastisol that forms the wear layer is cured, can be used in the printing ink formulations described herein. The Expancell™ line of microspheres, manufactured by Boud Chemicals, is one example of a commercially available expandible (and subsequently collapsible) microsphere. Micropearl®microspheres, manufactured by Lehmann & Voss, are another example.

The hydrocarbons or other "blowing agents" typically expand under mild heating conditions, for example, at temperatures between about 100 and about 150° C. Expansion of the core material, in turn, causes the shell to expand, at least at the heating temperature. Some microspheres have polymer shells that only allow the core material to expand at or near the heating temperature.

The microspheres typically have a diameter of between about 10 and 240 microns, although in one embodiment, the diameter is between about 10 and about 30 microns. It is typical of available microspheres that a given sample contains a range of sizes. The microspheres can be provided in the form of a powder or a wet cake, and can be mixed in with conventional water-based, plastisol-based or acrylate-based inks.

Expandable microspheres can be prepared from virtually any thermoplastic or thermosetting polymeric material, examples of which include polyvinyl chloride, polystyrene, vinylidene chloride, acrylonitrile and copolymers and blends thereof. Commercially available expandable microspheres include the Avancell® expandible microspheres, manufactured by Sekisui Chemical Co., Ltd. (Japan). These microspheres have an acrylonitrile copolymer shell.

The blowing agents which can be used in the process of the present invention include water and/or readily volatile inorganic or organic substances. Examples of volatile hydrocarbons include isobutane, isopentane and cyclopentane. Other examples include acetone, ethylacetate; halogen-substituted alkanes, such as methylene chloride, chloroform, ethylidene chloride, vinylidene chloride, monofluorotrichloromethane, chlorodifluoromethane, dichlorodifluoromethane, dichlorodifluoroethane, dichlorotrifluoroethane; also butane, hexane, heptane or diethyl ether. The microspheres can also optionally include other components, such as surface-active additives and pigments or dyes.

While not being limited to a particular theory, in one embodiment it is believed that the microspheres are collapsible in that they expand when heated, and collapse under the weight of the overlying wear layer to form a texture on the surface of the wear layer. When the microspheres are printed on a foamable layer, the surface texture is not raised as expected. If the wear layer is too thick, the amount of texturing is decreased and can be unnoticeable. Those of skill in the art can readily determine optimal sizes and/or concentrations for particular wear layers. Applicants surprisingly found that while they anticipated that the expansion of the microspheres would provide a particular form of a surface texture, the opposite was true. The microspheres actually expanded, but then collapsed under the weight of the wear layer to provide a different desired texture to the wear layer. The results obtained were completely opposite that which was expected, in that the expected high areas were inversed and textured.

When the inks containing microspheres were printed between two transparent solid plastisol wear layers, slightly raised surface texture could be obtained on the top thin wear layer. When the wear layer thickness was increased, no surface texture was observed, but a unique and desirable three-dimensional visual effect was seen. These inks can be printed in register with a pattern underlying the substrate and the first transparent wear layer to enhance the three-dimensional effect.

The microspheres are present as an additive in a rotogravure ink or other suitable printing ink formulation. Ink formulations including the microspheres can be used with standard rotagravure printing plates/rolls (optionally with increased engraving depth). The ink formulations can be printed and processed using conventional techniques.

The size and concentration of the microspheres in the printing ink compositions both can affect the degree and nature of the texturing of the wear layer and the gravure engraving depth required. In one embodiment, microspheres of more than one size are present in the printing ink compositions. In another embodiment, combinations of printing ink compositions are used to apply combinations of textures to the wear layer.

Clear Wear Layer

A clear wear layer is applied over the design layer, typically but not necessarily with a thickness of between 4 and 20 mils, for example, between 6 and 20 mils. Such layers are typically formed from a material that includes a PVC plastisol. Additional print layers can optionally be applied on top of the wear layer, particularly if a different texture is to be applied to an overlying top coat layer.

Top Coat Layer

In some embodiments, a top coat layer is applied over the wear layer. The top coat layer can be formed from UV-curable components, such as those including urethane acrylate oligomers and reactive diluents. The UV-curable components in the top coat layer can be cured by UV irradiation. The top coat layer formed using conventional top coating compositions is often in the range of between 0.2 and 2 mils thickness.

II. Methods of Forming Textured Wear Layers

The ink compositions are prepared by mixing a desired ink composition with a suitable amount of collapsible microspheres to achieve a desired texture in a wear layer of a desired thickness. The amount of microspheres necessary to impart this desired texture can be determined by routine experimentation using the information provided herein.

The resulting ink compositions can be applied to a suitable substrate as described above using conventional techniques. In one embodiment, rotagravure technology is used. Rotragravure printing uses cylinders in which the images are engraved or etched onto special plates. The ink fills the grooves and a doctor blade wipes off the excess. The substrate, typically wrapped around a roller, is pressed against the inked plate which is also mounted on a roller. Each color is applied in a separate engraved print cylinder, using an ink pan, a doctor blade and an impression roll. The depth of the etching or engraving controls the amount of ink transferred to the substrate. The deeper the etching or engraving, the deeper the color. A single cylinder can provide many different depths of color if the etching and/or engraving in some areas is different than in others. Depending on the size of the microspheres, it can be preferred to more deeply engrave and/or etch the cylinders to account for the thickness of the microspheres and/or to apply more of the ink composition to the surface.

Other printing techniques that can be used include roller or surface printing and screen printing. In roller printing, the inks are applied from a raised position on the roller, in contrast to rotogravure printing where the inks come in contact with the material from a sunken or "hollowed" area. In screen printing, the inks lay flat across the surface. These techniques are well known to those of skill in the art.

The ability to provide a significant texture to the surface covering is directly correlated to the size and/or concentration of collapsible microspheres in the ink composition and the thickness of the overlying wear layer. As a general rule, it is relatively more difficult to texture relatively thicker wear layers. The optimal microsphere concentration/wear layer thickness can be determined using routine experimentation. If desired, multiple print applications can be carried out increase the amount of microspheres in the printed areas. In one embodiment, the weight percent of the microspheres in the dried ink layer varies between about 3% to about 25%. In another embodiment, the weight percent of microspheres in the dried ink layer varies between about 10% to about 20%.

For illustrative purposes only, using standard rotagravure printing techniques, a wear layer of between 6 and 7 mils in thickness was textured using an ink composition including collapsible microspheres. A wear layer of about 10 mils thickness was textured by using a double print application. The texture was markedly reduced when the wearlayer thickness increased to 17 mils when the same print application applied under the 10 mils thick wear layer was applied under the 17 mils thick wear layer.

After the pattern is printed on a surface to be coated using the ink formulation including collapsible microspheres, a wear layer coating composition is applied and cured by application of heat. This is typically a plastisol formulation. The curing of the plastisol expands the microspheres, which then collapse under the weight of the overlying wear layer.

In some embodiments, one or more layers in the surface covering or surface covering component are mechanically embossed, either before or after the application of the design, wear and/or top coat layers. In those embodiments where a cured top coat layer is applied, cured, then subsequently mechanically embossed, the embossing can take place after the top coat layer is cured and then heated to soften the layer. [Check the change to the previous sentence.] Mechanical embossing is typically conducted by heating a layer to be embossed to soften the layer and applying an embossing roll to the softened layer under pressure. If desired, the embossed layer can be annealed at a temperature at which the layer is not liquid.

In some embodiments, one or more layers in the surface covering or surface covering component are chemically embossed, typically when a foaming inhibitor or accelerator is placed in the design layer. Such foaming inhibitors and accelerators are well known to those of skill in the art. The chemical embossing can be used to provide a grout line or other design feature in those areas where foaming is inhibited.

Figure 2:
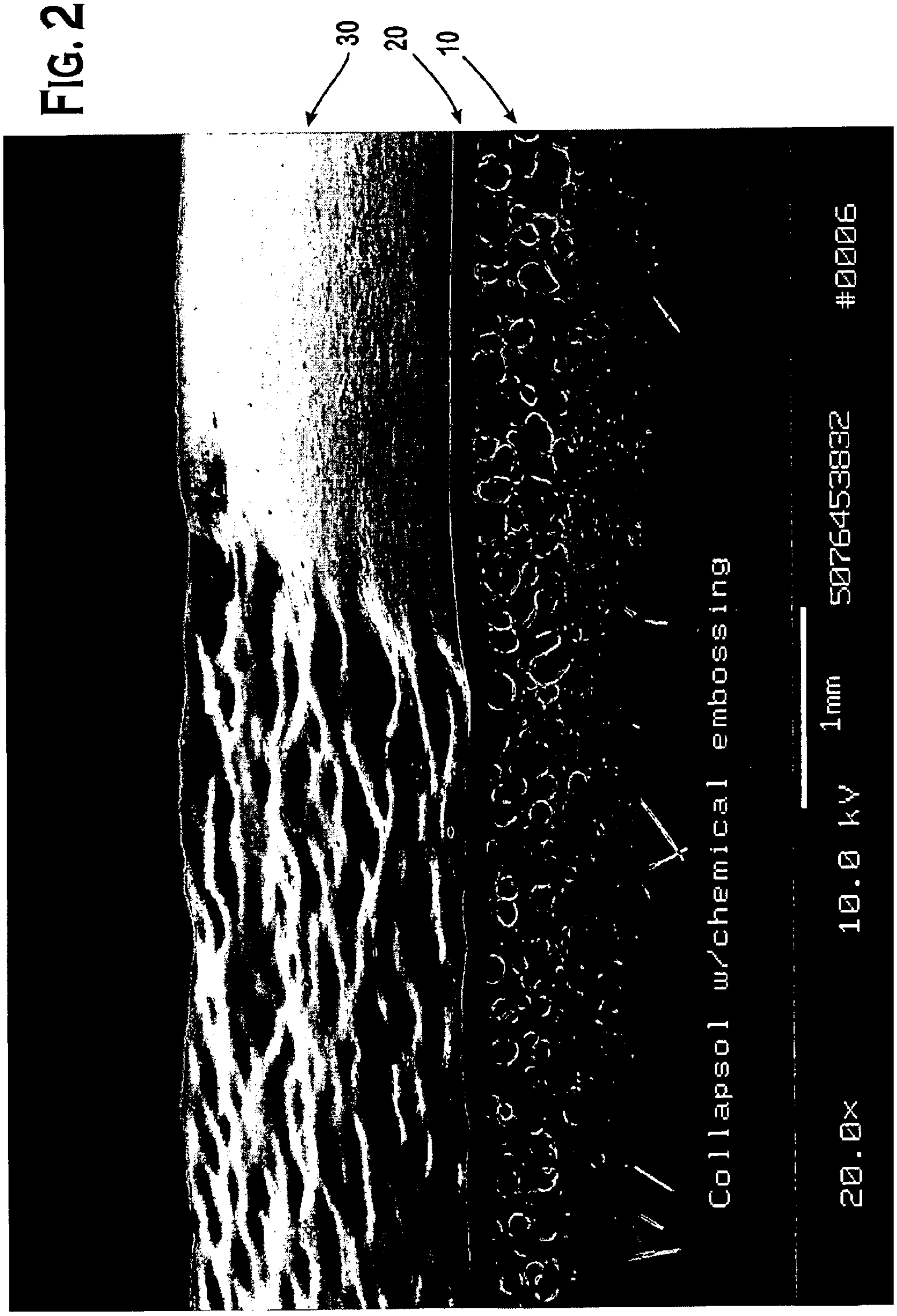
FIG. 2 is a schematic illustration of an embodiment of the methods described herein for providing a surface covering including textured portions produced by collapsed microspheres, where the surface covering has been chemically embossed.

Examples of the texture effect obtainable using the methods described herein are shown in FIGS. 1 and 2. FIGS. 1 and 2 represent cross sections of flooring products that include a standard European glass encapsulated foamable flooring substrate (10), a design layer overlying the foamable substrate (20) and a plastisol wear layer overlying the design layer (30). The design layer (20) is prepared using an ink formulation that includes collapsible microspheres. After the design layer and plastisol wear layer are applied, the flooring substrate is then exposed to sufficient heat to cure the plastisol wear layer and fuse and expand the foamable layer to provide the flooring product. The cross section of FIG. 1 shows the texture effect where the foamable layer was not chemically embossed. The cross section of FIG. 1 shows the texture effect where the foamable layer was chemically embossed. As shown in FIG. 2, using the methods described herein, it is possible to impart texture to chemically embossed regions.

The present invention will be better understood with reference to the following non-limiting examples.

EXAMPLE 1

Two commercially available microspheres—Expancell and Micropearl microspheres were evaluated. A total of 10–15 grades with varying particle size and start-and-end process expansion temperatures were tested. Variables such as supplier/product grade, addition level (i.e., % by weight of the microspheres in the ink formulations), water-based ink v. plastisol ink, print engraving (standard v. deeper laser etched), viscosity of the print medium, thickness of the wear layer, and surface performance (i.e., staining due to dirt entrapment) were evaluated. The weight percent of microspheres in the dried ink layer can vary between about 3% to about 25%, depending on the percent solids of the inks employed.

Desired results were obtained using Micropearl F-82D or Expancell 092 DU 120. No significant difference was found between the solvent or water-based inks. It can be advantageous to use deeper etching or engraving in the plates/cylinders due to the nature of the particle size of the microspheres. The optimum level of microsphere addition to a printing ink formulation that provided the desired texture was found to be about 3 to about 5% by weight, which corresponds to about 10% to about 15% by weight in the dried ink layer. It was observed that print quality improved if the ink formulations were dearated after the ink and microspheres were mixed. Adding microspheres to inhibited ink formulations provide a combination of surface texture and chemical embossing.

Four standard European glass encapsulated flooring product structures were prepared and each was rotagravure printed with a chip design rotagravure cylinder with laser-etched engraving using water-based inks containing 3% by weight of Micropearl F-82D. Subsequently, each was coated with the appropriate wear layers and fused/expanded under standard factory conditions. Two of the four samples were also prepared with a UV curable topcoat. The test results for the finished product are shown below in Table 1.

TABLE 1

| | Magnum UV (L.G.) | Magnum Non-UV | Diamond UV (H.G.) | RMA Non-UV |
|---|---|---|---|---|
| Texture Effect (feel + visual) | Almost none | Almost none | Slight | Good |
| Clearcoat Thickness (mm) | 0.33 | 0.32 | 0.24 | 0.15 |
| Gel Thickness | 0.35 | 0.33 | 0.43 | 0.40 |
| Overall Thickness | 3.08 | 3.08 | 2.70 | 1.46 |

General Observations:

It is desirable to print ink compositions including the microsphere additive with cylinders that include a relatively deeper engraving than cylinders used with ink compositions that do not include the microspheres.

Adding the micropheres to the ink compositions did not negatively effect the process at any stage during the application of the plastisol or the fusing of the plastisol to form the completed wear layer.

The thicker the wear layer, the more microspheres that are required to achieve a desired textural effect.

EXAMPLE 2

Flooring substrates were prepared with a 20 mil felt backing, and 17 mils of plastisol foamable gel (expanded to 35–40 mils upon fusion). The substrates were printed with a water-based rotagravure ink comprising 5% by weight Micropearl F82D microspheres, as shown below. Subsequently, the printed substrates were coated with a transparent PVC plastisol wear layer and the samples fused/expanded at 190° C. for 1.5 minutes. The results are shown below in Table 2.

TABLE 2

| | #1 | #2 | #3 | #4 |
|---|---|---|---|---|
| Wear layer thickness | 6 mils | 10 mils | 10 mils | 17 mils |
| # print layers | 1 | 1 | 2 | 2 |
| Texture | Good | Slight | Good | None |

EXAMPLE 3

The flooring substrates of Example 1 were first coated with a clear solid plastisol wear layer, and then rotagravure printed with an unpigmented water-based ink containing 3% by weight of the microspheres used in Example 1. The printed substrates were then coated with a second clear plastisol wear layer coating and fused/expanded as in Example 1. The results are shown below in Table 3.

TABLE 3

| | #1 | #2 |
|---|---|---|
| 1st solid wear layer thickness | 6 mils | 10 mils |
| 2nd solid wear layer thickness | 6 mils | 10 mils |
| Results | Slight raised texture | No texture, but 3-D visual effect |

This example indicates that slight raised surface texture can be achieved by placing the ink layer containing microspheres between two solid layers, but if the solid layers are transparent, a 3-D visual effect is achieved.

The optimum dimensional relationships for the parts of the invention, to include variations in size, materials, shape, form, function and manner of operation, assembly, and use, are deemed readily apparent and obvious to one skilled in the art. All equivalent relationships to those illustrated in the drawing and described in the specification are intended to be encompassed by the present invention. Further, the various components of the embodiments of the invention can be interchanged to produce further embodiments and these further embodiments are intended to be encompassed by the present invention.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A surface covering or surface covering component comprising a) a design layer and b) a wear layer overlying the design layer, wherein the design layer comprises collapsed microspheres, and wherein the surface covering or surface covering component has a feature selected from the group consisting of the surface of the wear layer distal the design layer having a texture, a three-dimensional visual effect at the surface of the design layer proximal the wear layer and the combination thereof, the feature resulting at least in part from the collapsed microspheres.

2. The surface covering or surface covering component of claim 1, further comprising a clear polymeric layer underlying the design layer.

3. The surface covering or surface covering component of claim 1, further comprising a top coat layer overlying the wear layer.

4. The surface covering or surface covering component of claim 1, wherein the surface covering or surface covering component is chemically embossed.

5. The surface covering or surface covering component of claim 4, wherein the chemically embossed areas correspond to a grout line in the design.

6. The surface covering or surface covering component of claim 1, wherein the surface covering or surface covering component is mechanically embossed.

7. A surface covering or surface covering component comprising a) a design layer comprising an ink including collapsed microspheres and b) a wear layer overlying the design layer, wherein the surface covering or surface covering component has a feature selected from the group consisting of the surface of the wear layer distal the design layer having a texture, a three-dimensional visual effect at the surface of the design layer proximal the wear layer and the combination thereof, the feature resulting at least in part from the collapsed microspheres.

8. The surface covering or surface covering component of claim 7, wherein the ink comprises about 3% to about 25% by weight of microspheres, on a dry weight basis.

9. The surface covering or surface covering component of claim 8, wherein the ink comprises about 10% to about 20% by weight of microspheres, on a dry weight basis.

10. The surface covering or surface covering component of claim 8, wherein the ink comprises about 1% to about 5% by weight of microspheres, when applied.

11. The surface covering or surface covering component of claim 10, wherein the ink comprises about 3% by weight of microspheres, when applied.

12. The surface covering or surface covering component of claim 7, wherein the ink further comprises a foaming inhibitor.

13. A surface covering comprising:

a) a substrate, b) a foamed layer overlying the substrate, c) a design layer overlying the foamed layer, d) a wear layer overlying the design layer, and e) optionally, a top coat layer overlying the wear layer, wherein the design layer comprises collapsed microspheres, and wherein the surface of the wear layer distal the design layer has a texture resulting at least in part from the collapsed microspheres.

14. A surface covering comprising:

a) a substrate, b) a transparent or translucent layer overlying the substrate, c) a design layer overlying the transparent or translucent layer, d) a wear layer overlying the design layer, and e) optionally, a top coat layer overlying the wear layer, wherein the design layer comprises collapsed microspheres, and wherein the surface covering has a three-dimensional effect at the surface of the design layer proximal the wear layer resulting at least in part from the collapsed microspheres.

15. The surface covering of claim 14, further comprising a foam layer between the substrate and the translucent or transparent layer.

16. The surface covering of claim 14, wherein the surface covering is chemically embossed.

17. The surface covering of claim 16, wherein the chemically embossed areas correspond to a grout line in the design layer.

18. The surface covering of claim 14, wherein the surface covering is mechanically embossed.

19. A surface covering comprising:

a) a substrate, b) a transparent or translucent layer overlying the substrate, c) a design layer overlying the transparent or translucent layer, d) a wear layer overlying the design layer, and e) optionally, a top coat layer overlying the wear layer, wherein the design layer comprises an ink including collapsed microspheres, and wherein the surface covering has a three-dimensional effect at the surface of the design layer proximal the wear layer resulting at least in part from the collapsed microspheres.

20. The surface covering of claim 19, wherein the ink comprises about 3% to about 25% by weight of microspheres, on a dry weight basis.

21. The surface covering of claim 20, wherein the ink comprises about 10% to about 20% by weight of microspheres, on a dry weight basis.

22. The surface covering of claim 20, wherein the ink comprises about 1% to about 5% by weight of microspheres, when applied.

23. The surface covering of claim 22, wherein the ink comprises about 3% by weight of microspheres, when applied.

24. The surface covering of claim 19, wherein the ink further comprises a foaming inhibitor.

* * * * *